United States Patent [19]

Norling et al.

[11] Patent Number: 5,156,460
[45] Date of Patent: Oct. 20, 1992

[54] CRYSTAL TEMPERATURE TRANSDUCER

[75] Inventors: Brian L. Norling, Mill Creek; Rex B. Peters, Woodinville, both of Wash.

[73] Assignee: Sundstrand Corporation, Rockford, Ill.

[21] Appl. No.: 609,247

[22] Filed: Nov. 5, 1990

[51] Int. Cl.$^5$ ............................................. G01K 11/22
[52] U.S. Cl. ............................... 374/117; 310/333; 310/368; 331/156
[58] Field of Search ............... 310/333, 361, 368, 338, 310/367, 320; 331/66, 154, 156, 153; 374/117, 118, 119, 183

[56] References Cited

U.S. PATENT DOCUMENTS

| | | | |
|---|---|---|---|
| 3,906,260 | 9/1975 | Oguchi | 310/96 |
| 4,139,793 | 2/1979 | Michel | 310/353 |
| 4,178,566 | 12/1979 | Kawashima | 331/156 |
| 4,215,570 | 8/1980 | Eer Nisse | 310/338 X |
| 4,216,402 | 8/1980 | Engdahl | 310/320 |
| 4,355,257 | 10/1982 | Kawashima et al. | 310/367 X |
| 4,450,378 | 5/1984 | Hermann et al. | 310/367 X |
| 4,511,821 | 4/1985 | Nakamura et al. | 310/367 X |
| 4,562,375 | 12/1985 | Besson et al. | 310/338 |
| 4,592,663 | 6/1986 | Eer Nisse et al. | 374/117 |
| 4,654,663 | 3/1987 | Alsenz et al. | 331/156 X |
| 4,658,174 | 4/1987 | Albert | 310/323 |
| 4,721,925 | 1/1988 | Farace et al. | 331/156 X |
| 4,772,130 | 9/1988 | Ueda et al. | 374/117 |
| 4,861,168 | 8/1989 | Ziegler et al. | 331/66 X |
| 4,873,465 | 10/1989 | Bourgeois | 310/367 X |

FOREIGN PATENT DOCUMENTS

| | | | |
|---|---|---|---|
| 132186 | 10/1979 | Japan | 310/367 |
| 149519 | 11/1980 | Japan | 310/367 |
| 222611 | 12/1983 | Japan | 310/367 |

OTHER PUBLICATIONS

Shrader, Robert L. *Electronic Communication* New York: McGraw-Hill, Inc., 1985, p. 211.

Primary Examiner—William A. Cuchlinski, Jr.
Assistant Examiner—G. Bradley Bennett
Attorney, Agent, or Firm—Fitch, Even, Tabin & Flannery

[57] ABSTRACT

A vibrating crystal transducer for measuring temperature is disclosed. The crystal includes a single elongated vibrating beam that has a torsional mode resonant frequency that is a function of the temperature of the crystal. The torsional moments of the crystal are reverse symmetric with respect to a nodal line on the beam. The beam is contained in a frame that is secured to a sensor frame member. The beam is attached to the frame by a pair of opposed mounting posts that are in line with the nodal line on the beam. The beam, the beam frame (16) and the mounting posts are formed out of an integral section of crystalline material. When the beam is vibrated, the reverse symmetrically opposed torsional moments along the beam cancel each other out and, consequently, no torsional energy is transmitted through the mounting posts to the beam frame or the sensor frame. Since the beam frame does not serve as a recipient for the torsional energy, torsional energy is not lost through the beam frame so that the beam has a relatively high quality factor and torsional vibration of the beam cannot cause the crystal to eventually work loose of the sensor frame at the beam frame.

28 Claims, 3 Drawing Sheets

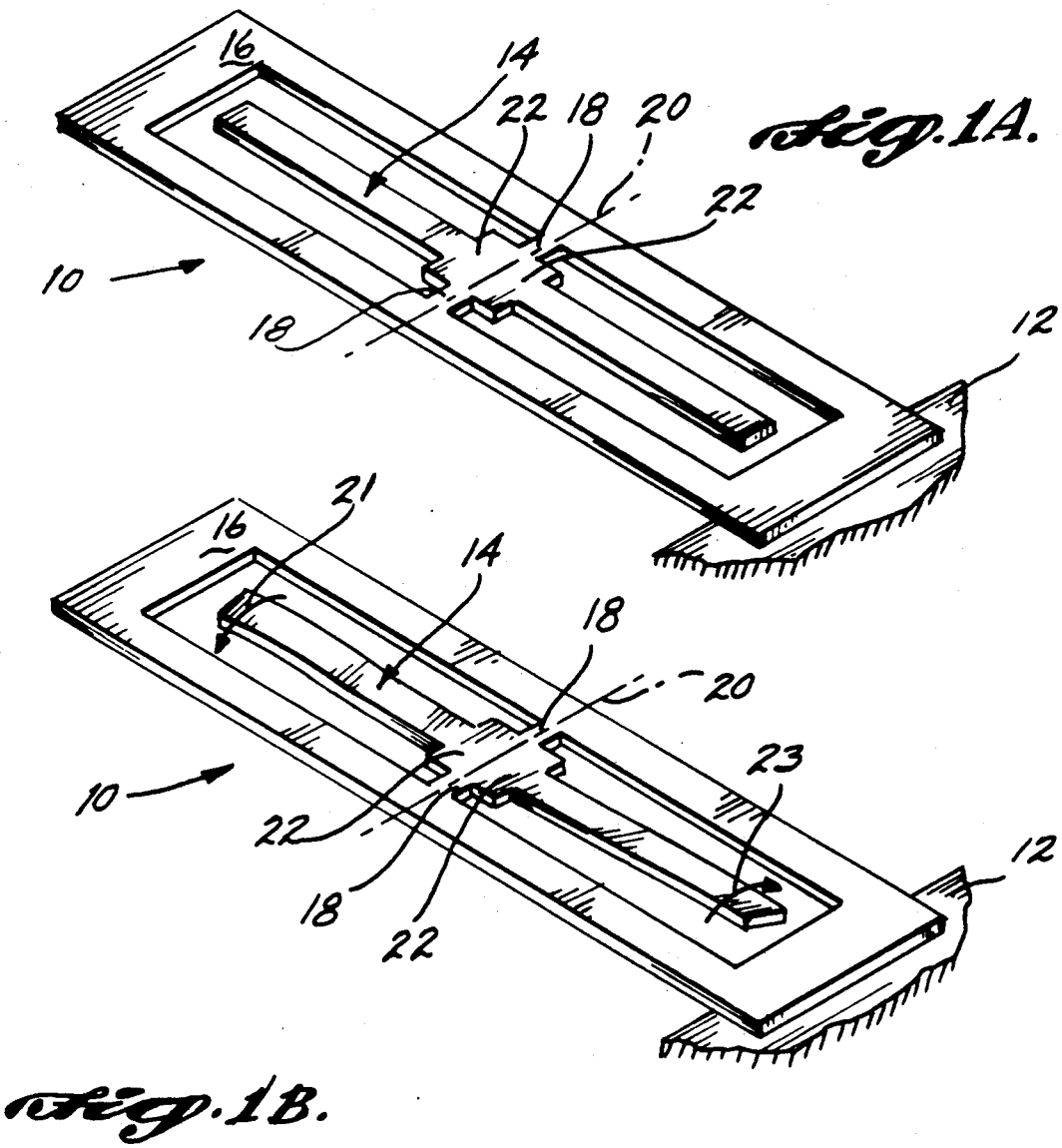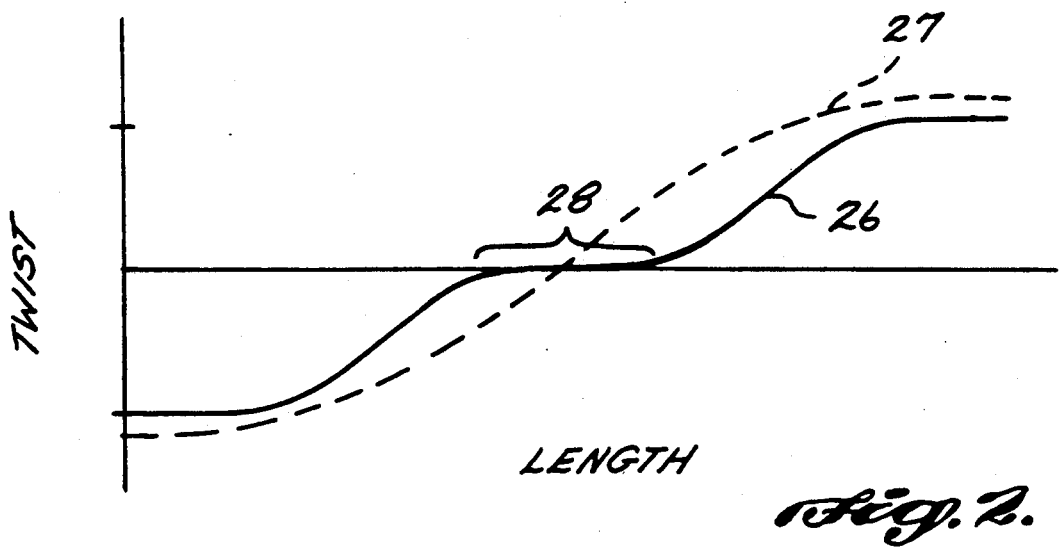

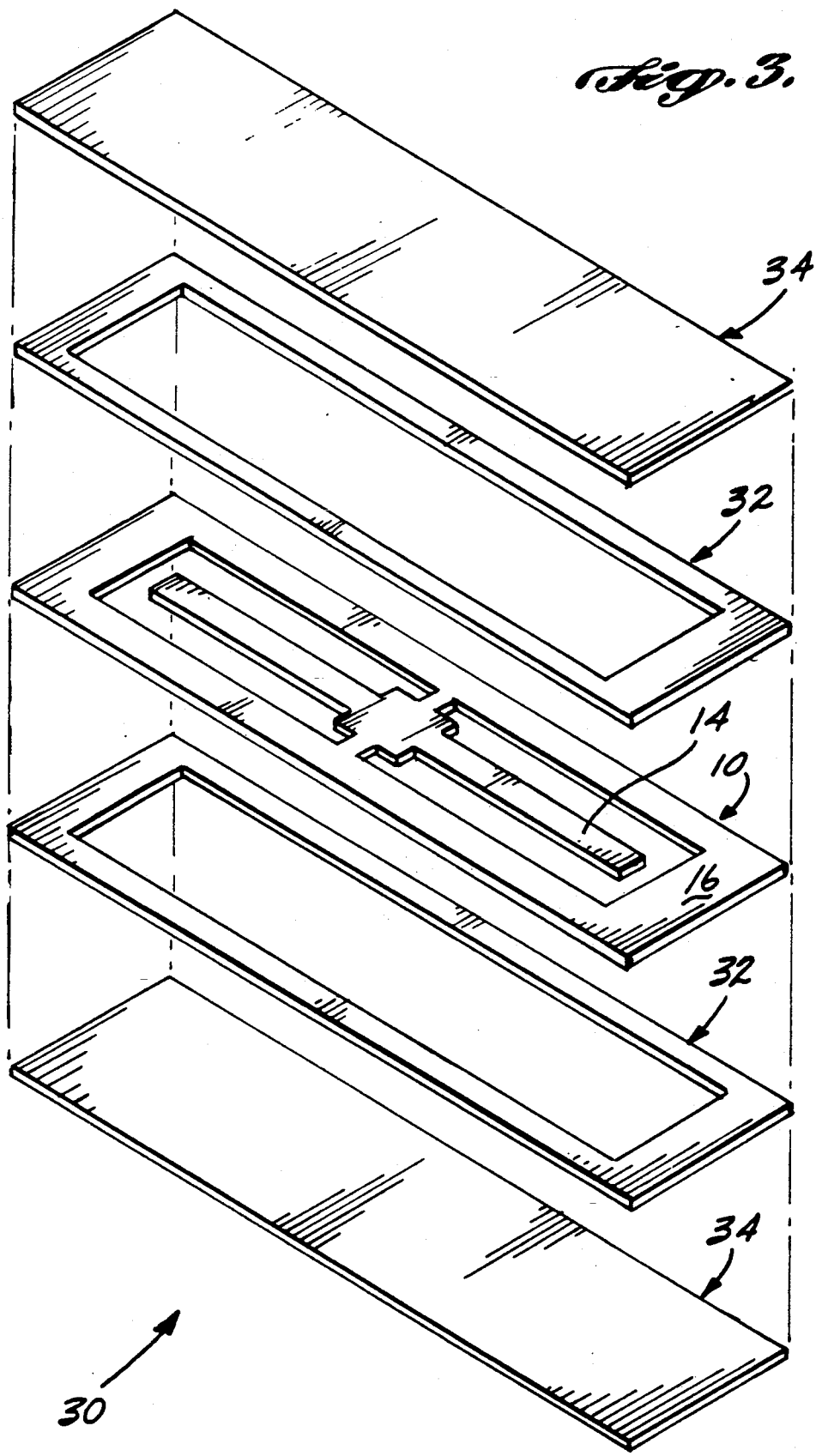

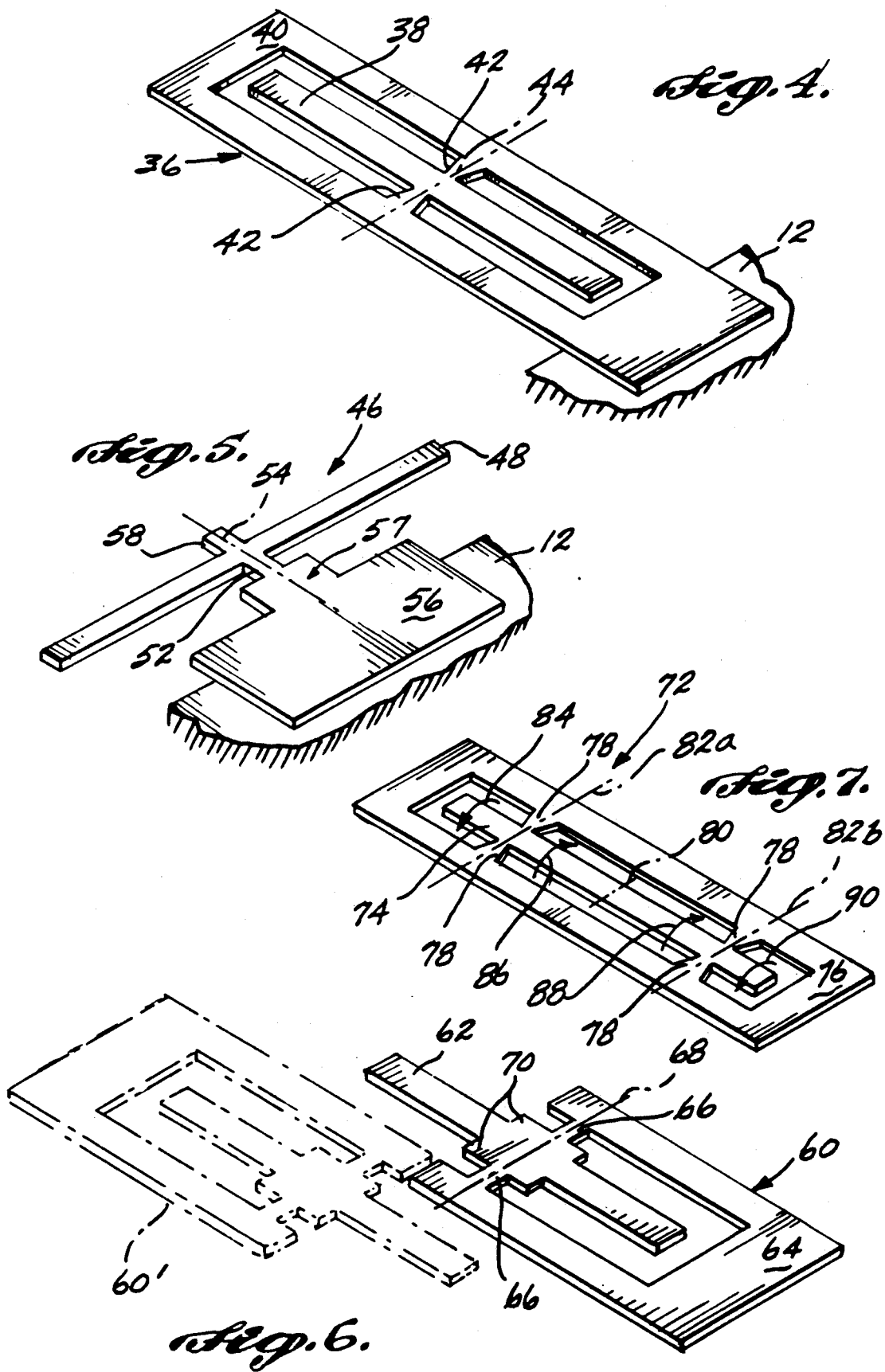

CRYSTAL TEMPERATURE TRANSDUCER

FIELD OF THE INVENTION

This invention relates to vibrating crystal transducers used to monitor temperature, and, more specifically, to a vibrating crystal temperature transducer that vibrates in the torsional mode.

BACKGROUND OF THE INVENTION

Vibrating crystal transducers are frequently used in modern sensors to provide an electrical signal representative of temperature. Vibrating crystals may be formed out of piezoelectric material, material that, when a voltage is applied, stresses such that the shape of the material is deformed and, conversely, when a stress is developed on the material, a voltage develops on the surface of the material. A vibrating crystal has a frequency, called resonant frequency, at which the cyclical stressing results in a peak admittance, the minimal impedance, to the applied voltage. In some crystals, the resonant frequency is not constant, but varies with respect to the temperature of the crystal. Temperature sensors that employ vibrating crystal transducers operate by applying a voltage to the crystal which is used to establish the resonant frequency of the crystal that, in turn, is measured as an indication of the temperature of the crystal and the surrounding environment.

Many vibrating crystal transducers are in the shape of a miniaturized tuning fork with two tines that are connected together at a common base which is firmly secured to a sensor frame. Electrodes on the tines and/or the base portion of the crystal provide the necessary phase and amplitude of voltage to cause the tines to vibrate at a stable amplitude. Vibrating crystal transducers used in temperature sensors are usually arranged to vibrate in the torsional mode, wherein the movement of each tine is a rotation, or twist, about the longitudinal axis of the tine. When such a vibrating crystal transducer is electrically excited, the tines vibrate symmetrically with respect to each other. In other words, one tine rotates clockwise and the other rotates counterclockwise. In a subsequent phase of vibration, the orientations of the rotation of the individual tines are reversed.

Torsionally vibrating crystal transducers have large temperature coefficients that make it possible for the transducers to provide extremely accurate temperature measurements. Torsionally vibrating crystal transducers also vibrate at high frequencies, around 250 KHz, in comparison to other vibrating crystals, for instance flexurally vibrating crystals that vibrate at approximately 35 KHz. The high resonant frequencies of torsionally vibrating crystals are sharply defined, which simplifies determining the exact instantaneous resonant frequencies of the crystals. Thus, for many purposes, where extremely accurate temperature measurements are required, torsionally vibrating crystal transducers are a preferred type of temperature sensor.

Moreover, torsionally vibrating crystal transducers are basically insensitive to acceleration. This feature makes the crystals readily suited for placement in vehicles and other moving objects where it is desirable to measure the environmental temperature since there is little possibility the crystals will be affected by the movement of the object. For example, torsionally vibrating crystals are well suited for incorporation in acceleration units where the temperature measurement they provide is used to compensate the signals from other vibrating crystals that measure accelerations.

A disadvantage of the conventional tuning fork-type crystal temperature transducers is that the energy of the torsional motion of the individual tines about parallel but not co-linear axes is transferred directly to the base in the form of an antisymmetric pair of bending moments. The bending of the base results in a loss of the energy applied to excite the tines to vibrate. Consequently, relatively high voltages must be applied to the crystal in order to sustain resonant vibration of the tines. The bending of the base, and consequent loss of energy, lowers the overall quality factor of the crystal which is the measure of sharpness or narrowness of the range of frequencies at which, at a given instant, the crystal may resonate. A crystal that, at a given instant, has only a very narrow, sharply defined resonant frequency has a high quality factor. A crystal with a broader, less defined resonant frequency is said to have a low quality factor. A low quality factor results in a less than precise measurement of the resonant frequency of the crystal that consequently reduces the overall accuracy of the temperature measurement. Moreover, a crystal with a low quality factor is more easily disturbed by environmental factors other than temperature.

Another disadvantage of a conventional tuning fork crystal is that it is sensitive to the mounting conditions at the point where its base is attached to the sensor frame. This sensitivity, which inherently varies from crystal to crystal, reduces the quality factor of individual crystals by different amounts. These individual variations in crystal quality factor increase the difficulty of optimizing the oscillator electronics when the crystals are installed in temperature sensor assemblies.

Furthermore, the vibrational energy transferred to the base of the crystal is transferred through the sensor frame to adjacent transducers, for example, adjacent vibrating crystal transducers used to measure force such as are found in accelerometers. The energy transferred to the adjacent transducers can adversely affect the ability of these transducers to accurately provide signal representative of the parameters they are designed to monitor. Still another problem associated with the vibrational energy transferred to the base is that, over time, the induced bending can significantly weaken the bond between the crystal and the sensor frame. The weakening of the bond between the crystal and the sensor frame can cause the resonant frequency of the crystal to change radically, and can even cause the crystal to break free of the body. In either case, the loosening of the crystal-to-sensor frame bond will render the transducer virtually useless for the purpose of making temperature measurements.

Moreover, since the crystal-to-sensor frame bond is so delicate, and because the crystal itself is small, a temperature sensor assembly that includes a torsionally vibrating crystal is often very fragile. This has made it difficult, if not impossible, to use a sensor with a torsionally vibrating crystal temperature transducer in an environment where the sensor would be subjected to significant mechanical shock. This fragility is aggravated by the slender attachment members used in some current mounting assemblies to try to isolate large bending moments.

SUMMARY OF THE INVENTION

This invention comprises a vibrating crystal temperature transducer constructed so that the torsional forces of the transducer cancel each other out so that bending of the transducer and the adjacent sensor frame is essentially eliminated. The crystal temperature transducer of this invention has torsional movement that is reverse-symmetric with respect to a nodal plane across the beam. The beam is mounted to a crystal mounting frame by a mounting post that is integral with both the beam and the mounting pad. The mounting post may be eccentrically shaped with a non-uniform cross section such that it has a relatively wide section adjacent either the beam or the mounting frame. Electrodes are selectively positioned on the beam so that when a voltage is applied to the beam, the vibration is in the correct torsional mode.

When a voltage is applied to this crystal temperature transducer, the beam vibrates, or twists, about the longitudinal axis. Vibrational twisting to one side of the nodal line is in one orientation of rotation, while the vibration on the opposite, or reverse, side of the nodal line is in the reverse rotation. Since the rotations, the torsional moments, of the two portions of the beam are reverse-symmetric with respect to each other, they cancel, blocking the transfer of torsional energy from the beam through the mounting post to the mounting pad. The eccentric section of the mounting post can restrict the twisting of the beam in the vicinity of the post. Thus, the transfer of torsional energy through the mounting post to the mounting pad is substantially eliminated by the cancellation of the torsional moment at the nodal plane and the minimization of the moment in the vicinity of the nodal plane. Consequently, the mounting pad is not subjected to any torsional rotation force. In other words, the mounting pad is not subjected to any bending, due to the vibration of the beam.

Since almost no torsional energy is lost into the mounting pad, only a minimal amount of energy is required to be supplied to the crystal in order to maintain resonant vibration. Thus, the crystal temperature transducer of this invention has a relatively high quality factor. Furthermore, since the mounting pad of the crystal temperature transducer does not bend, torsional energy is not transferred through the mounting pad to adjacent sensors where it can adversely affect the sensing capability of those transducers. Moreover, since there is no torsional bending of the mounting pad, the crystal temperature transducer of this invention remains firmly secured to the sensor frame and the resonant vibrations of the crystal within the desired frequencies for monitoring a given range of temperatures are maintained. Also, since only a minuscule amount of energy is lost when the crystal is mounted to a sensor frame, the crystal has substantially identical mounted and unmounted resonant frequencies. This simplifies the production of temperature sensor assemblies that employ these crystals.

In some embodiments of the invention, the eccentric section of the mounting post provides mechanical support for the beam which increases the resistance of the transducer to mechanical shock. In still other embodiments the crystal temperature transducer may be arranged to vibrate in a torsional mode which has two nodal planes. In these embodiments, the beam is attached to the frame by two spaced-apart posts that are located at the individual nodal planes. The arrangement of the posts provides significant resistance to any mechanical shocks to which the transducer may be subjected.

BRIEF DESCRIPTION OF THE DRAWINGS

This invention will be pointed out with particularity in the appended claims. The above and further advantages of the invention may be better understood by reference to the following detailed description taken in conjunction with the accompanying drawings, in which:

FIG. 1a is a perspective view of a crystal temperature sensor of this invention;

FIG. 1b is a perspective view of the beam of the crystal temperature sensor of FIG. 1a vibrating in the torsional mode;

FIG. 2 graphically depicts the position-rotational moment relationship along the length of the beam of the crystal temperature sensor of FIG. 1;

FIG. 3 is an exploded isometric view of a package used to house a crystal temperature sensor according to this invention;

FIG. 4 is a perspective view of another alternative embodiment of a crystal temperature sensor of this invention;

FIG. 5 is a perspective view of another alternative embodiment of a crystal temperature sensor of this invention;

FIG. 6 is a perspective view of another alternative embodiment of a crystal temperature sensor of this invention; and FIG. 7 is a perspective view of still another alternative embodiment of a crystal temperature sensor of this invention.

DETAILED DESCRIPTION OF THE INVENTION

FIG. 1a illustrates a crystal temperature transducer 10 of this invention secured at one end to a sensor frame member 12. Crystal temperature sensor 10 comprises an integral piece of crystal comprising a vibrating beam 14 attached to a mounting frame 16 by a pair of diametrically opposed mounting posts 18. The mounting frame 16 extends around the beam 14 and is secured to the sensor frame member 12 by an epoxy adhesive or other suitable fastening means (not illustrated). Electrodes (not illustrated) are arranged on the vibrating beam 14 so that when an oscillating voltage is applied across the electrodes, the beam 14 vibrates in a substantially torsional mode as depicted by the deformation of the beam shown in FIG. 1b. U.S. Pat. No. 4,437,773, incorporated herein by reference, depicts how electrodes can be attached to the beam 14 to cause torsional vibration.

The mounting posts 18 are secured to the beam 14 along a line known as a nodal line 20 which is the surface projection of the crystal's nodal plane. The nodal plane is the plane that extends perpendicularly through the longitudinal axis of the beam 14 and extends through the line about which the beam oscillations are reverse symmetric. The vibrating beam 14 is secured to outrigger sections 22 that are integral with the mounting posts 18, symmetrically located around the nodal line 20, and have a width approximately two times that of the portion of the mounting posts that extends upwards from the frame 16.

When a sufficient voltage is applied to the transducer 10, the beam 14 vibrates, or twists, in a substantially torsional mode. The resonant frequency of the vibration of the beam 14, which is measured by the admittance of the beam, is a function of the ambient temperature of the beam 14. Consequently, the frequency of vibration of the beam 14 can be used by methods well known in the art to measure the temperature of the beam 14 and thus the temperature of the surrounding environment.

The torsional vibration of the beam 14 is reverse-symmetric with respect to the nodal line 20. As depicted by arrows 21 and 23 at the ends of the beam 14 in FIG. 1b, the torsional moments on each side of the beam 14 are in equal and reverse orientation with respect to each other, and, accordingly, cancel each other out to minimize the amount of torsional energy from the torsional moments transferred from the beam through the mounting posts 18 to the mounting frame 16. Since the torsional energy that is lost into the frame 16 and adjacent sensor frame member 12 is reduced, the amount of input energy required to maintain the torsional movement of the beam 14 is similarly reduced. Moreover, since the torsional energy of the beam 14 is not lost into the mounting frame 16 and adjacent sensor frame member 12, the beam has a relatively high quality factor, that is, the resonant frequency of the beam is very well-defined, which makes the beam a well-suited sensor to measure ambient temperature.

Furthermore, since there is minimal transfer of torsional energy into the mounting frame 16, the frame is not subject to any twisting that can, in turn, be transferred as mechanical energy through the sensor frame member 12 to other transducers mounted nearby. Also, since the mounting frame 16 is not subject to twisting, the crystal 10 remains securely fastened to the sensor frame member 12.

The outrigger sections 22 also contribute to the elimination of the torsional energy transfer to the mounting frame 16. The outrigger sections 22 stiffen the beam 14 so as to substantially eliminate torsional movement of the beam adjacent the outrigger sections and the mounting posts 18 that are integral therewith. The reduction of beam twisting in the vicinity of the mounting posts 18 further eliminates the twisting of the posts which otherwise would be transferred to the mounting frame 16 as torsional energy.

The stiffening of the beam 14 by the mounting post outrigger sections 22 also increases the resonant frequency of the beam. Thus, selective dimensioning of the outrigger sections 22 can be used as means to provide a crystal 10 with a beam 14 that vibrates within given select frequency ranges. Furthermore, the outrigger sections 22 also provide significant mechanical support for the beam 14 which prevents the beam from separating from the frame 16 when the crystal 10 is subjected to significant mechanical shock.

FIG. 2 graphically depicts the torsion angle along the beam 14 wherein the abscissa is representative of position along the beam, the ordinate represents the polarity and magnitude of the torsion angle of the beam, and solid curve 26 represents the torsion angle-position plot along the beam. Where the mounting post outrigger sections 22 are attached to the beam 14, represented by the position of the curve 26 under bracket 28, there is minimal angular motion. On either side of the portion of the beam 14 attached to the outrigger sections 22, the torsional moment is in equal and reverse orientation so as to cancel each other out. The combination of the minimal angular motion in the vicinity of the mounting posts 18, and the remaining torsional moment cancelling out, substantially eliminates the transfer of torsional energy through the mounting posts 18 to the mounting frame 16 and adjacent structure.

The beam 14 may also be connected to the mounting frame 16 without the outrigger sections 22 depicted in FIGS. 1a and 1b. In such embodiment of the invention (not illustrated), the mounting posts 18 would extend directly between the beam 14 and the frame 16. Curve 27 of FIG. 2 depicts the corresponding torsion angle plot for such a beam without outriggers. As depicted by curve 27, the angular motion is still minimal at the nodal plane. However the steepness of the curve in the vicinity of the mounting posts requires that the posts have a minimal cross-sectional width in order to achieve comparably low transfers of torsional energy.

FIG. 3 is an exploded view of a package 30 containing the crystal 10. The crystal 10 forms the center element of the package 10 and, more specifically, the mounting frame 16 forms the center portion of the outer body of the package 30. Spacer frames 32 are located on either side of the crystal 10 and are attached to the mounting frame 16. A cover 34 is provided over each of the spacer frames 32 to entirely enclose the vibrating beam 14. The spacer frames 32 are dimensioned so that during the maximum normal torsional movement of the vibrating beam, the beam 14 will not strike the covers 34. Each element of the package 30 should be made entirely out of crystalline quartz, or other elements having the same coefficient of expansion as the crystal 10, in order to minimize the effects of stresses due to temperature changes.

An alternative crystal 36 constructed in accordance with this invention is described with reference to FIG. 4. The crystal 36 includes a beam 38 and a mounting frame 40 substantially identical to the beam 14 and mounting frame 16 of crystal 10. Diametrically opposed mounting posts 42 connect the beam 38 and the frame 40, and are located along a nodal line 44 with respect to which the torsional vibrations of the beam 38 are reverse-symmetric. The mounting posts 42 are in the shape of a filled-in V such that they are relatively narrow at the point of attachment to the beam 38 and have an outward taper such that the point of attachment to the frame 40 is relatively wide.

An advantage of the crystal 36 is that it has a lower frequency of torsional vibration which may be desirable for some temperature measurements. Another advantage of crystal 36 is that the mounting posts 42, while only connected to the beam 38 along a narrow region, offer a significant degree of mechanical strength since they are bonded to the frame 40 across a relatively wide region. The wide base portions of the mounting posts 42 also minimize the amount of torsional energy that is transferred from the beam 38 to the frame 40 and adjacent sensor structure.

FIG. 5 depicts a crystal 46 according to this invention manufactured of a minimum amount of quartz. Crystal 46 comprises a vibrating beam 48 attached to a mounting pad 50 by a single mounting post 52. The mounting post 52 is attached to the beam 48 along a nodal line 54. The torsional vibrations along the beam are reverse symmetric with respect thereto. At the base of the mounting post 52 adjacent the mounting pad 50 is an outrigger section 57 of generally rectangular shape. A trim mass 58, positioned on the nodal line 54 opposite the mounting post 52, extends from the top of the vibrating beam 48. When the beam 48 vibrates, the torsional moments along either side of the beam 48 cancel each other out and are thus blocked from passing through the mounting post 52 to the mounting pad 50. The trim mass 58 restricts the torsional moment of the beam 48 in the vicinity of the nodal line 54 to further minimize the torsional energy that is transferred through the mounting post 52. The outrigger section 57 provides additional mechanical strength for supporting the beam in the case of mechanical shock. An advantage of crystal 46 is that it is formed out of only a minimal piece of quartz so that a large number of crystals 40 can be formed from a single section of quartz. Still another advantage of crystal 46 is that its large exposed surface area, small total mass and the lack of shielding around the vibrating beam 48 minimize the lag between changes in ambient temperature and changes in the crystal's resonant frequency. This makes crystal 46 especially well suited to measure rapid changes in temperature.

A crystal 60 that can also be manufactured out of a small section of quartz is depicted in FIG. 6. Crystal 60 includes a vibrating beam 62 connected to a mounting frame 64 that only partially encloses the beam 62. The beam 62 is connected to frame 64 by mounting posts 66 along a nodal line 68 such that the torsional vibrations on the beam are reverse symmetric with respect thereto. Outrigger sections 70 adjacent the beam 62 stiffen the beam and provide mechanical strength to the beam-mounting post connection.

The construction of crystal 60 eliminates the transfer of vibrational energy from the vibrating beam to the mounting frame 64 and the adjacent sensor frame structure (not illustrated) the crystal 60 is mounted to. Moreover, since the frame 64 only surrounds approximately two-thirds of the beam 62, a second crystal 60', shown in phantom, can be formed nearby on a single slice of quartz. This increases the number of crystals that can be formed on a single section of quartz.

FIG. 7 depicts a crystal 72 designed to vibrate in a torsional mode which has two nodal planes. The crystal 72 includes a vibrating beam 74 attached to a mounting pad 76 by a set of mounting posts 78 such that there are two sets of spaced apart mounting posts on either side of the beam 74. Electrodes (not illustrated) are positioned on the beam 74 so that when a voltage is applied, the beam vibrates in a torsional mode which has two nodal planes and three antinodes, which are lines of maximum torsional motion. There is an antinode at each end of the beam 74 and one in the center of the beam. The motion may be thought of as what would be the result of joining the adjacent ends of the two crystals shown in FIG. 6 and then driving them with a relative phase which provides mirror image symmetry with respect to their common antinode located along the beam lateral centerline 80. The mounting posts 78 have approximately a filled in V-profile and are attached at the narrow end to the beam 74 and at the wide end to the frame 76. Each set of posts 78 are attached to the beam along a nodal line 82a or 82b for each half of the vibrating crystal. The nodal lines 82a and 82b are symmetrically located around the centerline 80. In the illustrated embodiment of the invention, each nodal line 82a and 82b is located a distance one-quarter of the beam's length from the adjacent end of the beam.

When an appropriate voltage is applied to the crystal 72, the beam 74 vibrates in a mirror image symmetric mode. Arrows 84-90 depict the rotation of the beam 74 during one phase of vibration. As depicted by arrows 84 and 86 the rotation of one half of the beam 74 is reverse symmetric around one of the nodal lines 82a, and the vibration in the other half of the beam as depicted by arrows 88 and 90 is reverse symmetric with respect to the other nodal line 82b. Since the vibrations are reverse symmetric with respect to the nodal lines 82a, 82b, the amount of torsional energy that is transferred from the beam 74 through the post 78 into the frame 76 and adjacent sensor frame is minimized. Moreover, the vibrating beam 74 is securely fastened to the mounting frame 76 by the spaced apart mounting posts 78. Thus, the crystal 72, while being able to torsionally vibrate so as to provide a measure of ambient temperature, is rugged and can be subjected to significant mechanical shock and substantially blocks the transfer of torsional energy from the vibrating beam 74 to the surrounding components.

The foregoing description has been limited to specific embodiments of this invention. It will be apparent, however, from the description that the invention can be practiced using torsionally vibrating beam crystals of types not specifically described in the foregoing description. For example, in some embodiments of the invention it may be desirable to provide a vibrating beam with outrigger sections and to connect the beam to a frame with V-shaped mounting post integrally connected to the outrigger sections. Such construction would exchange a small reduction in crystal ruggedness for a large increase in the isolation of the beam's torsional energy.

In still other embodiments of the invention, other constructions connecting a vibrating beam to the associated mounting pad or frame through an integral piece of crystal so that the torsional vibration along the beam is symmetrical with respect to the mounting posts can, of course, be used. Moreover, while the described basic beams each have uniform, linear cross sectional areas, the invention may be used with beams having various shapes other than those disclosed. For example, the invention may be used with beams having variations in width, variations in thickness, or beams with non-linear shapes. Furthermore, the invention may be used with beams having trim masses on one or both sides. In some of these embodiments of the invention the trim masses may be selectively placed to ensure that when the beam vibrates, its nodal line is in line with its mounting posts. Also, while the components of the described package 30 are made entirely out of crystalline quartz, such example is not meant to be limiting. The package may be constructed out of any other material that is suitable to form a hermetic seal around the crystal therein.

Therefore, it is an object of the appended claims to cover all such modifications and variations as come within the true spirit and scope of the invention.

The embodiments of the invention in which an exclusive property or privilege is claimed are defined as follows:

1. A temperature sensor comprising a body formed from an integral piece of material, said body comprising: a vibrating beam that has a torsional vibration frequency that is a function of temperature, said beam having torsional moments associated with said vibrations and a vibrational nodal line; a mounting pad adapted for connecting the temperature sensor to a support; and, a mounting post extending between said mounting pad and said beam along said nodal line wherein said mounting post has a non-uniform cross-section.

2. The temperature transducer of claim 1, wherein said mounting post is provided with a first section that extends from said mounting pad and has a first cross-sectional width, and a second, outrigger, section adjacent said beam connected to said first section wherein said outrigger section has a cross-sectional width greater than the cross-sectional width of said first section.

3. The temperature transducer of claim 1, wherein said mounting post is provided with a first section that extends from said beam and has a first cross-sectional width, and a second, outrigger, section adjacent said mounting pad connected to said first section wherein said outrigger section has a cross-sectional width greater than the cross-sectional width of said first section.

4. The temperature transducer of claim 1, wherein said mounting post has a generally V-shaped profile such that a first end of said post has a first width and a second end of said post has a second width greater than said first width.

5. The temperature transducer of claim 4, wherein said mounting post is arranged so that said end having a wider cross-sectional width is integral with said mounting pad and said end having narrower cross-sectional width is integral with said beam.

6. The temperature sensor of claim 5, wherein said mounting frame extends completely around said vibrating beam.

7. The temperature sensor of claim 5, further including:
a spacer frame adjacent each side of said mounting frame and dimensioned so that said vibrating beam movements are within the space defined by said sensor frames; and,
a cover disposed over each of said sensor frames so as to entirely encapsulate said vibrating beam therein.

8. The temperature sensor of claim 1, wherein said mounting pad comprises a mounting frame which extends around substantially all of said beam, said beam connected to said frame by two opposed mounting posts located in line with said nodal line.

9. The temperature transducer of claim 8, wherein each said mounting post is formed with a first section that extends from said mounting pad and has a first cross-sectional width, and a second, outrigger, section adjacent said beam connected to said first section wherein said outrigger section has a cross-sectional width greater than the cross-sectional width of said first section.

10. The temperature transducer of claim 8, wherein each said mounting post has a generally V-shaped profile such that a first end of said post has a first width and a second end of said post has a second width greater than said first width.

11. The temperature transducer of claim 10, wherein each said mounting post is arranged so that said end having a wider cross-sectional width is integral with said mounting pad and said end having narrower cross-sectional width is integral with said beam.

12. The temperature sensor of claim 11, wherein said mounting frame extends completely around said vibrating beam.

13. The temperature sensor of claim 12, further including:
a spacer frame adjacent each side of said mounting frame and dimensioned so that said vibrating beam movements are within the space defined by said sensor frames; and,
a cover disposed over each of said sensor frames so as to entirely encapsulate said vibrating beam therein.

14. The temperature sensor of claim 1, wherein said beam has at least two vibrational nodal lines, and further including at least two mounting posts extending between said beam and said mounting pad, wherein each of said mounting posts is in line with a separate one of said nodal lines and has a non-uniform cross section.

15. The temperature transducer of claim 14, wherein each said mounting post is formed with a first section that extends from said mounting pad and has a first cross-sectional width, and a second, outrigger, section adjacent said beam connected to said first section wherein said outrigger section has a cross-sectional width greater than the cross-sectional width of said first section.

16. The temperature transducer of claim 14, wherein each said mounting post has a generally V-shaped profile such that a first end of said post has a first width and a second end of said post has a second width greater than said first width.

17. The temperature transducer of claim 16, wherein each said mounting post is arranged so that said end having a wider cross-sectional width is integral with said mounting pad and said end having narrower cross-sectional width is integral with said beam.

18. The temperature sensor of claims 14, 15, 16, 17, wherein said mounting pad comprises a mounting frame which extends around substantially all of said beam and said beam is connected to said frame by two opposed mounting posts located in line with said nodal lines.

19. The temperature sensor of claim 18, wherein said mounting frame extends completely around said vibrating beam.

20. The temperature sensor of claim 19, further including:
a spacer frame adjacent each side of said mounting frame and dimensioned so that said vibrating beam movements are within the space defined by said sensor frames; and,
a cover disposed over each of said sensor frames so as to entirely encapsulate said vibrating beam therein.

21. A torsional mode vibrator particularly usable as a temperature sensor, comprising:
a crystal beam resonator adapted to vibrate in a torsional mode upon application of an oscillatory signal thereto, said beam having opposing ends that torsionally vibrate in opposite directions about the longitudinal axis of the beam in response to the oscillatory signal, said beam having a nodal line intermediate said opposing ends wherein the torsional vibrations of said opposing ends substantially cancel;
a beam supporting member integrally formed with said beam positioned along said nodal line; and
a mounting member integrally formed with said beam supporting member.

22. A torsional mode vibrator as recited in claim 21 further including a trim mass integrally formed with said beam positioned at said nodal line.

23. A torsional mode vibrator as recited in claim 21, wherein said mounting member forms a frame surrounding one of said opposing ends.

24. A torsional mode vibrator as recited in claim 23 further including a second beam supporting member integrally formed with said beam and said frame positioned along said nodal line opposite said beam supporting member.

25. The temperature transducer of claim 21, wherein said beam supporting member is provided with a first section that extends from said mounting member and has a first cross-sectional width, and a second, outrigger, section adjacent said beam connected to said first section wherein said outrigger section has a cross-sectional width greater than the cross-sectional width of said first section.

26. The temperature transducer of claim 21, wherein said beam supporting member is provided with a first section that extends from said beam and has a first cross-sectional width, and a second, outrigger, section adjacent said mounting member connected to said first section wherein said outrigger section has a cross-sectional width greater than the cross-sectional width of said first section.

27. The temperature transducer of claim 21, wherein said beam supporting member has a generally V-shaped profile such that a first end of said beam supporting member has a first width and a second end of said beam supporting member has a second width greater than said first width.

28. The temperature transducer of claim 27, wherein said beam supporting member is arranged so that said end having a wider cross-sectional width is integral with said mounting pad and said end having narrower cross-sectional width is integral with said beam.

* * * * *